United States Patent
Tiedemann, Jr. et al.

[19]

[11] Patent Number: 5,822,318
[45] Date of Patent: *Oct. 13, 1998

[54] METHOD AND APPARATUS FOR CONTROLLING POWER IN A VARIABLE RATE COMMUNICATION SYSTEM

[75] Inventors: Edward G. Tiedemann, Jr., San Diego, Calif.; Klein S. Gilhousen, Bozeman, Mont.; Joseph P. Odenwalder, Del Mar, Calif.; Ephraim Zehavi; Jeffrey A. Levin, both of San Diego, Calif.; Charles E. Wheatley, III, Del Mar, Calif.

[73] Assignee: Qualcomm Incorporated, San Diego, Calif.

[*] Notice: The term of this patent shall not extend beyond the expiration date of Pat. No. 5,528,593.

[21] Appl. No.: 283,308

[22] Filed: Jul. 29, 1994

[51] Int. Cl.⁶ ........................................ H04Q 7/30
[52] U.S. Cl. .......................................... 370/391; 455/403
[58] Field of Search ...................... 330/130, 134, 330/279; 455/69, 116, 38.3, 355, 33.1, 522, 403; 375/205, 285, 224, 259; 379/59, 60; 370/391

[56] References Cited

U.S. PATENT DOCUMENTS

| | | | |
|---|---|---|---|
| 3,925,782 | 12/1975 | Anderl et al. | 343/178 |
| 4,112,257 | 9/1978 | Frost | 179/2 |
| 4,123,718 | 10/1978 | Lampert et al. | 325/474 |
| 4,193,031 | 3/1980 | Cooper et al. | 455/38 |
| 4,222,115 | 9/1980 | Cooper et al. | 375/1 |
| 4,225,976 | 9/1980 | Osborne et al. | 455/226 |
| 4,495,648 | 1/1985 | Giger | 455/73 |
| 4,580,262 | 4/1986 | Naylor et al. | 371/5 |
| 4,613,990 | 9/1986 | Halpern | 455/33 |
| 4,641,322 | 2/1987 | Hasegawa | 375/1 |
| 4,672,658 | 6/1987 | Kavehrad et al. | 379/63 |
| 4,765,753 | 8/1988 | Schmidt | 379/60 |
| 4,766,599 | 8/1988 | Miyazaki | 375/222 |
| 4,777,653 | 10/1988 | Bonnerot et al. | 455/69 |
| 4,811,421 | 3/1989 | Havel et al. | 455/69 |
| 4,868,795 | 9/1989 | McDavid et al. | 367/77 |
| 4,870,698 | 9/1989 | Katsuyama et al. | 455/67 |
| 4,901,307 | 2/1990 | Gilhousen et al. | 370/18 |
| 5,056,109 | 10/1991 | Gilhousen et al. | 375/1 |
| 5,077,742 | 12/1991 | Tsumura et al. | 371/32 |
| 5,093,840 | 3/1992 | Schilling | 375/1 |
| 5,257,283 | 10/1993 | Gilhousen et al. | 375/1 |
| 5,425,051 | 6/1995 | Mahany | 455/62 |
| 5,450,616 | 9/1995 | Rom | 455/54.1 |
| 5,504,773 | 4/1996 | Padovani et al. | 375/200 |
| 5,528,593 | 6/1996 | English et al. | 370/84 |

FOREIGN PATENT DOCUMENTS

| 0212667 | 3/1985 | European Pat. Off. | H04L 1/08 |
|---|---|---|---|
| 9217011 | 2/1992 | WIPO | H04K 1/00 |

*Primary Examiner*—Wellington Chin
*Assistant Examiner*—Jean B. Corrielus
*Attorney, Agent, or Firm*—Russell B. Miller; Sean English

[57] ABSTRACT

A method and apparatus for controlling transmission power in a variable rate communication system is disclosed. The method disclosed provides for a closed loop power control method. A first remote station controls the transmission power of a second remote station by transmitting a rate dependent power control signal to the second remote communication station. Since only the second communication knows its transmission rate a priori, it must determine its course of action in accordance with both the received power control signal and the knowledge of its transmission rate.

65 Claims, 4 Drawing Sheets

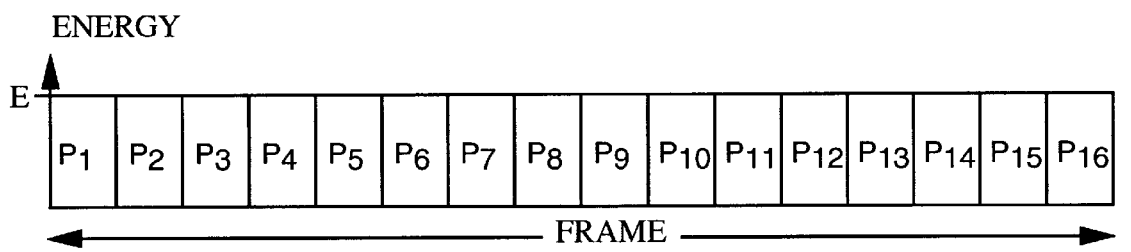
PRIOR ART FIG. 2a
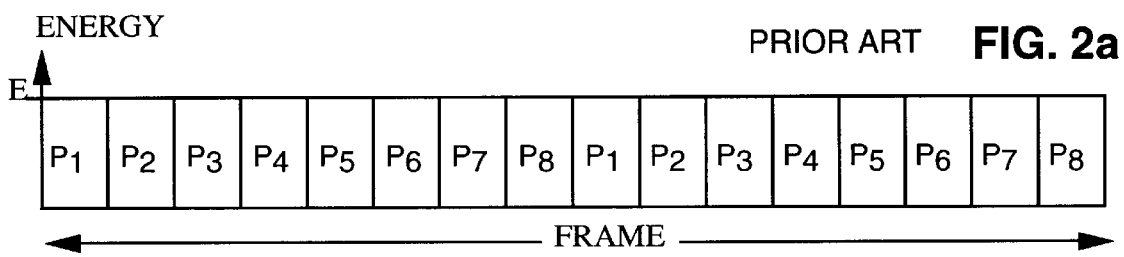
PRIOR ART FIG. 2b
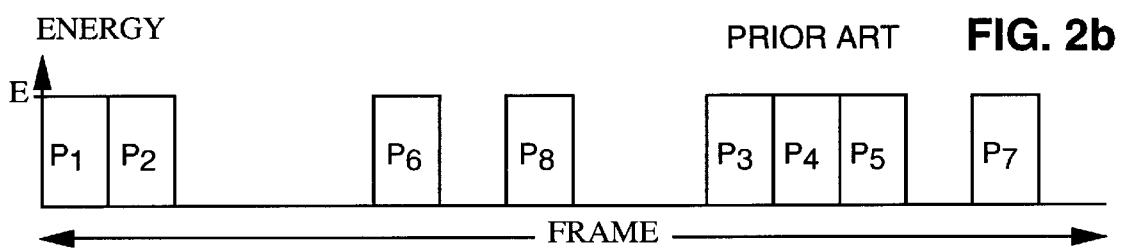
PRIOR ART FIG. 2c
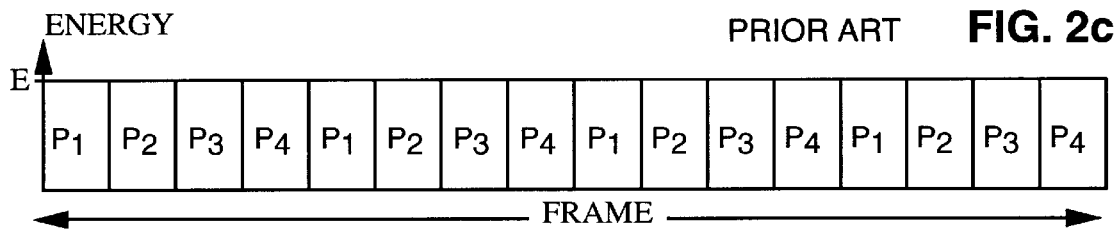
PRIOR ART FIG. 2d
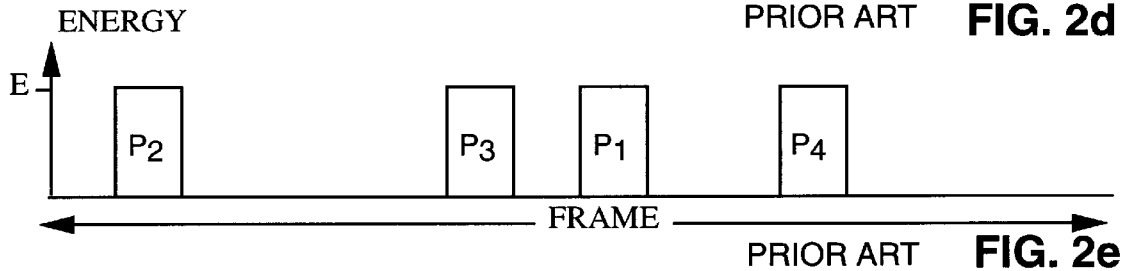
PRIOR ART FIG. 2e
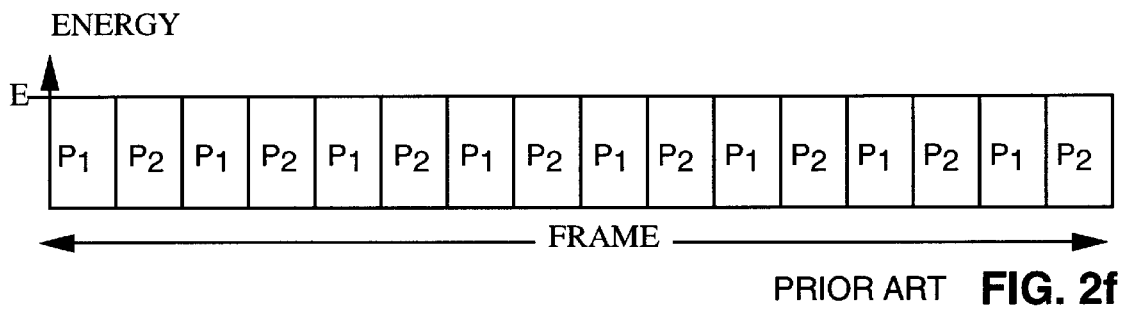
PRIOR ART FIG. 2f

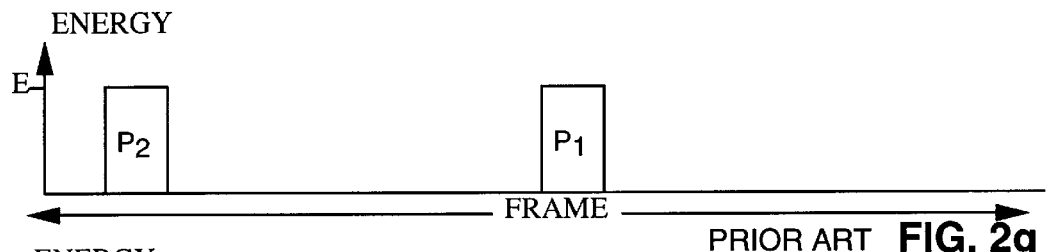
PRIOR ART FIG. 2g
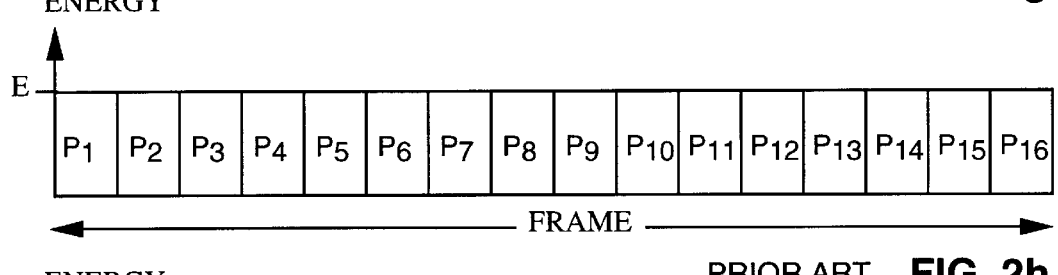
PRIOR ART FIG. 2h
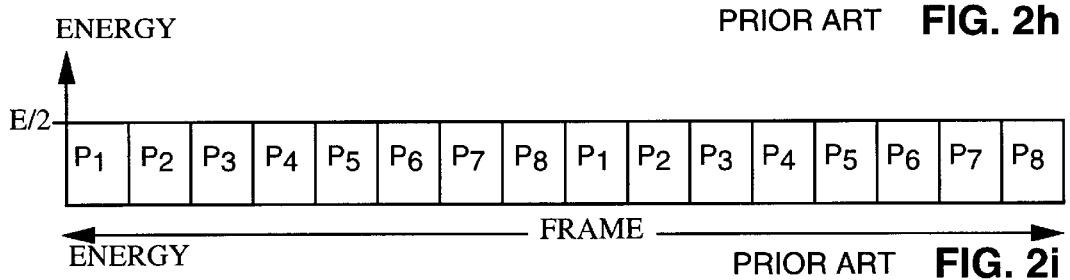
PRIOR ART FIG. 2i
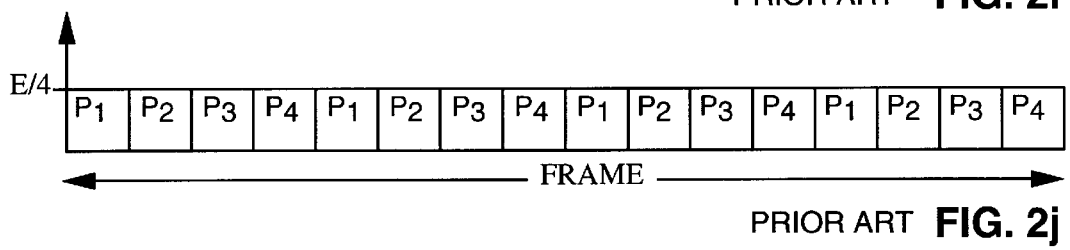
PRIOR ART FIG. 2j
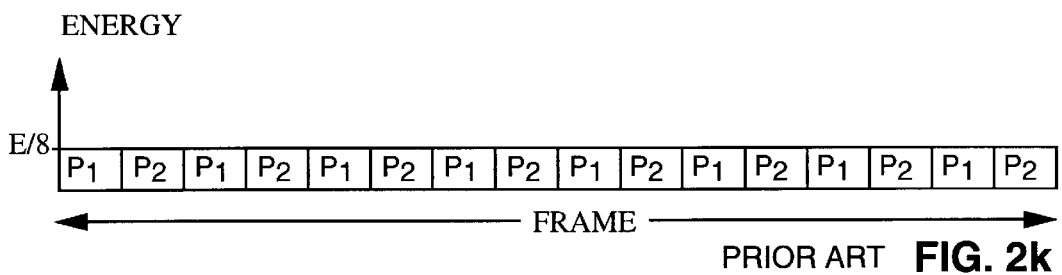
PRIOR ART FIG. 2k

METHOD AND APPARATUS FOR CONTROLLING POWER IN A VARIABLE RATE COMMUNICATION SYSTEM

BACKGROUND OF THE INVENTION

I. Field of the Invention

The present invention relates to communication systems. More particularly, the present invention relates to a novel and improved method and apparatus for controlling transmission power in a variable rate communication system.

II. Description of the Related Art

The use of code division multiple access (CDMA) modulation techniques is one of several techniques for facilitating communications in which a large number of system users are present. Other multiple access communication system techniques, such as time division multiple access (TDMA) and frequency division multiple access (FDMA) are known in the art. However, the spread spectrum modulation technique of CDMA has significant advantages over these modulation techniques for multiple access communication systems. The use of CDMA techniques in a multiple access communication system is disclosed in U.S. Pat. No. 4,901,307, issued Feb. 13, 1990, entitled "SPREAD SPECTRUM MULTIPLE ACCESS COMMUNICATION SYSTEM USING SATELLITE OR TERRESTRIAL REPEATERS", assigned to the assignee of the present invention, of which the disclosure thereof is incorporated by reference herein. The use of CDMA techniques in a multiple access communication system is further disclosed in U.S. Pat. No. 5,103,459, issued Apr. 7, 1992, entitled "SYSTEM AND METHOD FOR GENERATING SIGNAL WAVEFORMS IN A CDMA CELLULAR TELEPHONE SYSTEM", assigned to the assignee of the present invention, of which the disclosure thereof is incorporated by reference herein.

A method for transmission of speech in digital communication systems that offers particular advantages in increasing capacity while maintaining high quality of perceived speech is by the use of variable rate speech encoding. The method and apparatus of a particularly useful variable rate speech encoder is described in detail in U.S. Pat. No. 5,414,796, issued May 9, 1995, which is a continuation application of now abandoned U.S. patent application Ser. No. 07/713,661, filed Jun. 11, 1991, entitled "VARIABLE RATE VOCODER", assigned to the assignee of the present invention, of which the disclosure thereof is incorporated by reference herein.

The use of a variable rate speech encoder provides for data frames of maximum speech data capacity when said speech encoding is providing speech data at a maximum rate. When a variable rate speech coder is providing speech data at a less that maximum rate, there is excess capacity in the transmission frames. A method for transmitting additional data in transmission frames of a fixed predetermined size, wherein the source of the data for the data frames is providing the data at a variable rate is described in detail in U.S. Pat. No. 5,504,773, issued Apr. 2, 1996, which is a continuation application of now abandoned U.S. patent application Ser. No. 07/822,164, filed Jan. 16, 1992, entitled "METHOD AND APPARATUS FOR THE FORMATTING OF DATA FOR TRANSMISSION", assigned to the assignee of the present invention, of which the disclosure thereof is incorporated by reference herein. In the above mentioned patent application a method and apparatus is disclosed for combining data of differing types from different sources in a data frame for transmission.

In frames containing less data than a predetermined capacity, power consumption may be lessened by transmission gating a transmission amplifier such that only parts of the frame containing data are transmitted. Furthermore message collisions in a communication system may be reduced if the data is placed into frames in accordance with a predetermined pseudorandom process. A method and apparatus for gating the transmission and for positioning the data in the frames is disclosed in U.S. Pat. No. 5,659,569 issued Apr. 19, 1997, which is a continuation application of now abandoned U.S. patent application Ser. No. 07/846,312, filed Mar. 5, 1992, entitled "DATA BURST RANDOMIZER", assigned to the assignee of the present invention, of which the disclosure thereof is incorporated by reference herein.

A useful method of power control of a mobile in a communication system is to monitor the power of the received signal from the mobile station at a base station. The base station in response to the monitored power level transmits power control bits to the mobile station at regular intervals. A method and apparatus for controlling transmission power in this fashion is disclosed in U.S. Pat. No. 5,056,109, issued Oct. 8, 1991, entitled "METHOD AND APPARATUS FOR CONTROLLING TRANSMISSION POWER IN A CDMA CELLULAR TELEPHONE SYSTEM", assigned to the assignee of the present invention, of which the disclosure thereof is incorporated by reference herein.

In an alternative continuous transmission strategy, if the data rate is less than the predetermined maximum the data is repeated within the frame such that the data occupies the full capacity of the data frame. If such a strategy is employed, power consumption and interference to other users may be reduced during periods of data transmission at less than the predetermined maximum by reducing the power at which the frame is transmitted. This reduced transmission power is compensated by the redundancy in the data stream and can offer benefits in range for a fixed maximum transmission power.

A problem that is encountered in controlling transmission power in the continuous transmission strategy is that the receiver does not know the transmission rate a priori and so does not know the power level that should be received. The present invention provides a method and apparatus for controlling transmission power in a continuous transmission communication system.

SUMMARY OF THE INVENTION

The present invention is a novel and improved method and apparatus for closed loop transmission power control in a communication system. It is an object of the present invention to provide timely power control that is necessary to provide robust communication link quality under fast fading conditions. It is noted that the different methods for power control can be changed by exchanging of signaling data in the course of the transmission. Such changes in power control format may be desirable in response to changes in channel characteristics or changes in the service be accommodated.

Further, it should be noted that power control techniques are presented in the exemplary embodiment in a variable rate communication system, however the methods presented are equally applicable for fixed rate communication systems and for communication systems where the data rate varies with both ends of the communication link aware of the transmission rate. In the cases where the transmission rate is known, only the information relating to the known rate must be transmitted.

In an exemplary embodiment, the present invention discloses a variable rate communication system where a first communication device is for the transmission of a data packet of variable rate data in a data frame of a predetermined data capacity to a second communication device, and when the data packet is less than the data capacity generating repeated versions of bits in the data packet and providing first version of the data packet bits and the repeated versions of the data packet bits in the data frame and wherein the transmission power for transmitting the data frame is scaled in accordance with the data rate, a system for controlling the transmission power of the first communication device at the second communication device comprising a receiver means for receiving the data frame, frame quality determination means for determining a frame quality factor from the data frame, a comparison means for comparing the frame quality factor against at least one threshold value wherein the threshold value to provide a quality signal that is suitable for the data rate, and transmitter means for transmitting the quality signal.

In an exemplary embodiment, the present invention further discloses a first communication device for the transmission of a data packet of variable rate data in a data frame of a predetermined data capacity to a second communication device wherein when the data packet is less than the data capacity generating repeated versions of bits in the data packet and providing first version of the data packet bits and the repeated versions of the data packet bits in the data frame and wherein in the transmission power for transmitting the data frame is scaled in accordance with the data rate, a system for controlling transmission power at the first communication device responsive to a power control signal comprising a receiver means for receiving the power control signal and a control processor means for determining in accordance with the power control signal and the data rate a transmission control signal.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIGS. 2a–k are illustrations of frame formats of the prior art reverse link and of the frame formats for frames of the present invention.

DETAILED DESCRIPTION OF THE PREFERRED EMBODIMENTS

Figure 1:
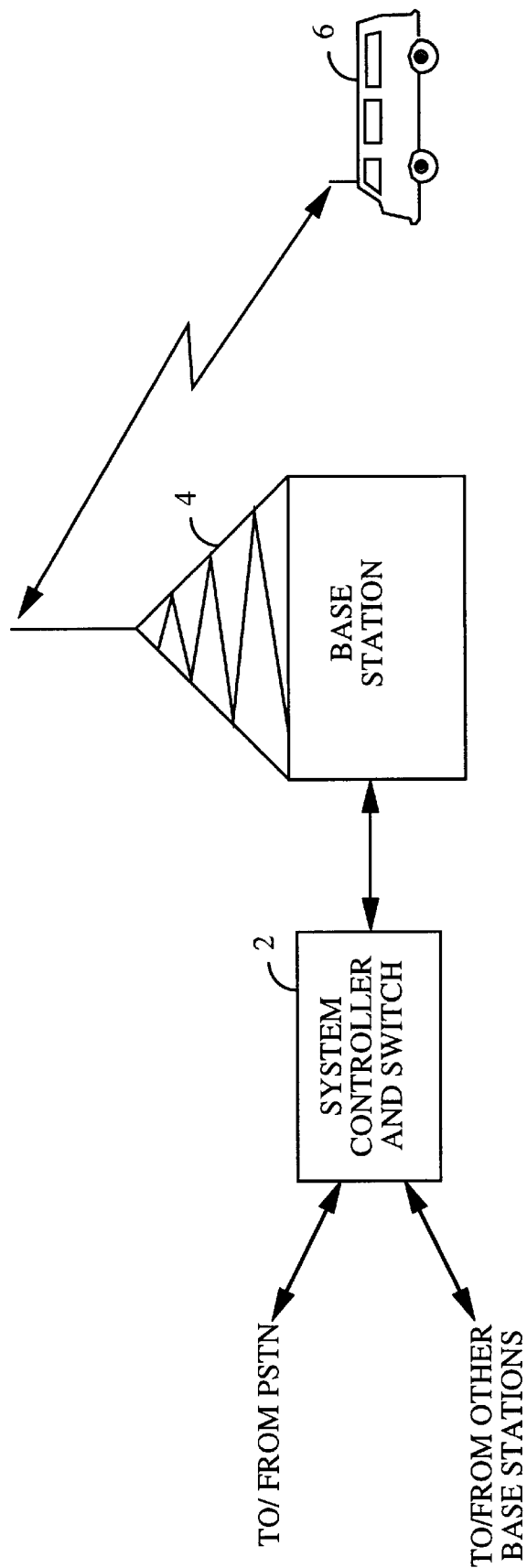
FIG. 1 is an illustration of an exemplary mobile telephone system.

Referring to FIG. 1, information may be provided to and from a public switching telephone network (PSTN) to system controller and switch 2, or may be provided to and from controller and switch 2 by another base station if the call is a mobile station to mobile station communication. System controller and switch 2, in turn, provides data to and receives data from base station 4. Base station 4 transmits data to and receives data from mobile station 6.

In the exemplary embodiment the signals transmitted between base station 4 and mobile station 6 are spread spectrum communication signals, the generation of the waveforms of which are described in detail in the above-mentioned U.S. Pat. No. 4,901,307 and U.S. Pat. No. 5,103,459. The transmission link for communication of messages between mobile station 6 and base station 4 is referred to as the reverse link and the transmission link for communication of messages between base station 4 and mobile station 6 is referred to as the forward link.

Figure 3:
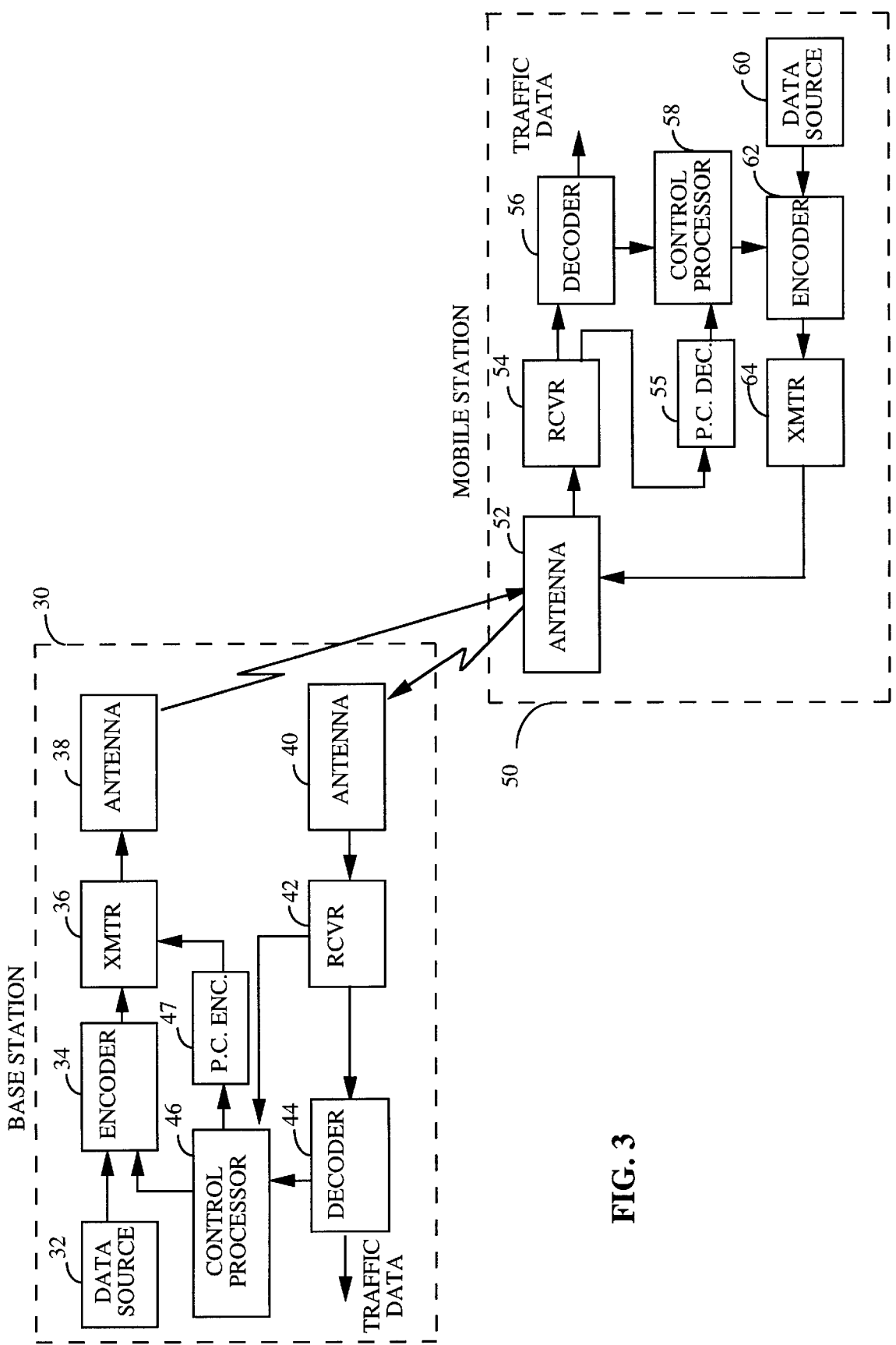
FIG. 3 is an illustration of the apparatus of the present invention.

In the exemplary embodiment, the present invention is used to control the transmission power of mobile station 6. However, the methods of power control of the present invention are equally applicable to controlling the transmission power of base station 4. Referring to FIG. 3, base station 30 and mobile station 50 are illustrated in block diagram form showing the apparatus for providing control of the transmission power of mobile station 50 of the present invention.

In conventional reverse link implementations, frames of variable rate data are transmitted from a mobile station to a base station using transmission gating when the data of transmission frames is less than a predetermined maximum. FIGS. 2a–g illustrates an exemplary frame structure for a transmission gated communication link. FIG. 2a illustrates a frame of full rate data comprised of 16 unique power control groups ($P_1$–$P_{16}$) of transmission data.

FIGS. 2b–c illustrate a transmission frame of half rate data. Half rate data only requires half of the capacity of the data frame. The data is then provided in duplicate as illustrated in FIG. 2b, with each unique power control group ($P_1$–$P_8$) provided twice in the frame. This repetition frame is provided to a gating means that gates out half of the power control groups so that only one unique version of each power control group is transmitted as illustrated in the transmission frame of FIG. 2c.

FIGS. 2d–e illustrate a transmission frame of quarter rate data. Quarter rate data only requires one quarter of the capacity of the data frame. The data is replicated four times as illustrated in FIG. 2d, with each unique power control group ($P_1$–$P_4$) provided four times in the frame. This repetition frame is provided to a gating means that gates out three fourths of the power control groups so that only one unique version of each power control group is transmitted as illustrated in the transmission frame of FIG. 2e.

FIGS. 2f–g illustrate a transmission frame of eighth rate data. Eighth rate data only requires one eighth of the capacity of the data frame. The data is provided as eight duplicates as illustrated in FIG. 2f, with each unique power control group ($P_1$–$P_2$) provided eight times in the frame. This repetition frame is provided to a gating means that gates out seven eighths of the power control groups, so that only one version of each unique power control group is transmitted as illustrated in the transmission frame of FIG. 2g.

Power control, in systems where frames are transmitted as illustrated in FIGS. 2a–g, is provided by comparing the received power of each power control group against a predetermined power threshold and transmitting a single bit in return indicative of the power received being too high or too low. Since the mobile station is aware of which of the power control groups were gated out, it ignores the power control messages sent for gated out power control groups.

In the communication link of the present invention, repetition of the data in power control groups is provided as described in relation to FIGS. 2b, 2d and 2f. It should be noted that the ordering of the power control groups of the frames in FIGS. 2b, 2d and 2f is for exemplary purposes and that the present invention applies equally to any power control group ordering. In the present invention, gating of the redundant data is not performed, rather the entire repetition frame is transmitted, but with the transmission power decreased proportionally to the amount of redundancy existing in the transmission frames.

The exemplary transmission frames of the present invention are illustrated in FIGS. 2h–2k. It should be noted that the present invention applies equally to any ordering of the power control groups in transmission frames. In FIG. 2h, a full rate frame is illustrated. There are sixteen unique power control groups of data which occupy the entire capacity of the data frame and which are transmitted at a highest transmission power level. In FIG. 2i a half rate frame is illustrated. There are eight unique power control groups of data with a repetition rate of two and which are transmitted at approximately one half of the highest transmission power level. In FIG. 2j, a quarter rate frame is illustrated. There are four unique power control groups with a repetition rate of four and which are transmitted at approximately one quarter of the highest transmission power level. In FIG. 2k, an eighth rate frame is illustrated. There are two unique power control groups with a repetition rate of eight which are transmitted at approximately one eighth of the maximum transmission power level.

The transmission power can be reduced without degrading the link quality in the transmission of repetition frames by taking advantage of the redundancy by coherently or noncoherently combining the repeated signals and by taking advantage of forward error correction techniques available in the correction of data frames containing redundancy, which are well known in the art.

In this transmission scheme, power control is significantly more complicated if the receiver does not know the rate a priori at which the data is being transmitted. As illustrated in FIGS. 2h–2k, the adequacy of the received power depends entirely on the rate at which the data was transmitted, information which the receiver does not know a priori. The following describes methods by which power control can be implemented in a communication system of this type.

If a communication link degrades, then the link quality can be improved by reducing the data rate of transmissions on the link and introducing redundancy for error correction purposes into the traffic stream or by increasing the transmission power of the transmitting device. In the exemplary embodiment of controlling transmission power of the mobile station 50, some of the methods for determining that the transmission power of mobile station 50 should be increased or that the data rate of mobile station should be decreased include:

(a) base station detection of high frame error rate on reverse link;
(b) mobile station detects its power is at a maximum for the reverse link;
(c) base station detects that received power is low on reverse link;
(d) base station to mobile station range is large; and
(e) mobile station location is poor.

Conversely, some of the methods for determining that the transmission power of mobile station 50 should be decreased or that the data rate of mobile station may be increased include:

(a) base station detection of low frame error rate on reverse link;
(b) mobile station detects its power is lower than a threshold for the reverse link;
(c) base station detects that received power is high on reverse link;
(d) base station to mobile station range is low; and
(e) mobile station location is good.

It is often desirable to reduce the data transmission rate, in order to strengthen a data link instead of increasing the transmission power on that link. There are three reasons to reduce the data rate in order to improve link connections. The first reason is that the transmission system may already be at its maximum transmission power. The second reason is that the transmission system may be operating off of stored battery power and as such increased transmission power would reduce operating time. The third reason is that, in the exemplary embodiment of a CDMA system, a users transmissions are noise to other users transmitting to the base station and it is desirable to limit this interference.

When mobile station 50 detects a need to modify the transmission rate, control processor 58 in mobile station 50 sends a signal specifying a modified rate set to variable rate data source 60. The modified rate set is a set of rates at which data source 60 is permitted to source data. In response to the modified rate signal, variable rate data source 60 provides all data for transmissions within the modified rate set. Data source 60 may source modem, facsimile or speech data. Data source 60 may be a variable rate source that varies its transmission rate on a frame to frame basis throughout the transmission or it may be able to vary rates only upon command. A variable rate speech source is described in detail in the aforementioned U.S. Pat. No. 5,414,796.

A need for modification of the data rate set may be indicated by one of the conditions enumerated above. If the method by which it is determined that the data rate set should be modified is a position related effect such as range or mobile station location, then an external signal is provided to control processor 58 indicative of the location condition. This location condition may be detected by mobile station 50 or by base station 30 and transmitted to mobile station 50. In response, control processor 58 provides a signal indicative of a modified rate set at which mobile station 50 may transmit.

Alternatively if the method by which a need for rate modification is detected is due to a transmission power condition (e.g., the transmission power of the mobile is a maximum or below a threshold), then a signal is provided from transmitter (XMTR) 64 to control processor 58 indicative of the transmission power. Control processor 58 compares the transmission power to predetermined thresholds and in accordance with this comparison may provide a rate set indication to variable rate data source 60.

In a closed loop power control implementation, power control signals are provided from base station 30 to mobile station 50. The method by which base station 30 determines the power control signal depends upon the link characteristic that base station 30 uses as the determination of link quality. For example, base station 30 may determine the power control signal in accordance with received power or alternatively in accordance with frame error rate. The present invention is equally applicable to any link quality factors.

If the link quality factor used is received power, then the signal from mobile station 50 received at base station 30 by antenna 40 is provided to receiver (RCVR) 42 which provides an indication of the received power to control processor 46. If the link quality factor used is frame error rate, then receiver 42 downconverts and demodulates the signal and provides the demodulated signal to decoder 44. Decoder 44 determines an indication of error rate and provides a signal indicative of the error rate to control processor 46.

Control processor 46 compares the link quality factor provided against a threshold or set of thresholds which may be static or varying. Control processor 46 then provides the power control information to either encoder 34 or power control encoder (P.C. ENC.) 47. If the power control information is to be encoded into the data frame, then the power control data is provided to encoder 34. This method requires that an entire frame of data be processed before transmitting the power control data. Then encoded traffic data and power control data frames are then provided to transmitter (XMTR) 36. The power control data may simply overwrite portions of the data frame or may be placed in predetermined vacant positions in the transmission frame. If the power control data overwrites traffic data, then this may be corrected by forward error correction techniques at mobile station 50.

In implementations that process a full frame of data before providing the power control data, delay is caused which is undesirable in fast fade conditions. An alternative is to provide the power control data directly to transmitter 36 where it may be punctured into the outgoing data stream. If the power control data is transmitted without error correction coding then power control encoder 47 simply passes the power control data to transmitter 36. If error correction coding is desired for the power control data, without incurring the delay of waiting for a full frame of data to be processed, then power control encoder 47 provides an encoding of the power control data without regard to the outgoing traffic data. Transmitter 36 upconverts, modulates the signal and provides it to antenna 38 for transmission.

The transmitted signal is received at antenna 52 and provided to receiver (RCVR) 54 where it is downconverted and demodulated. If the power control data is encoded with a full frame of traffic data then the traffic and power control data is provided to decoder 56. Decoder 56 decodes the signal and separates the power control signal from the traffic data.

If, on the other hand the power control data is not encoded with a full frame of data but rather punctured into the transmission stream of data, then receiver 54 extracts the power control data from the incoming data stream and provides the encoded data to power control decoder (P.C. DEC.) 55. If the power control data is encoded, then power control decoder 55 decodes the power control data and provides the decoded power control data to control processor 58. If the power control data is not encoded then the data is provided directly from receiver 54 to control processor 58.

The power control signal is provided to control processor 58, which in accordance with the power control signal provides a signal to variable rate data source 60 indicative of an appropriate rate set or a transmission signal to transmitter 64 indicative of a modified transmission power level.

Base station 30 does not know the data rate of the transmitted frame a priori, so in the implementation wherein power varies in accordance with the redundancy of the data in the frame or data rate of the frame, then the determination of a power control signal from received link quality characteristics is rate dependent. In one implementation, mobile station 30 may include bits representing the data rate at the beginning of a frame in an uncoded fashion. This may be acceptable if the frames contain enough bits of information that the impact on capacity is not large.

In an alternative implementation, base station 30 may estimate the rate of the frame from the first part of the frame. For example, a preamble could be added at the start of each frame and the base station could estimate the rate to be the one that provides the best preamble correlation.

In another exemplary implementation of providing a rate dependent power control signal, multiple bits of power control information may be provided from base station 30 to mobile station 50. In a first multiple bit power control signal implementation received power is used as the link quality factor. Receiver 42 provides a received power measurement signal to control processor 46. Control processor 46 compares the received power value against a set of thresholds.

In the exemplary first multiple bit power control signal implementation embodiment, there is one threshold indicative of a nominal received power for each rate hypothesis. Control processor 46 provides a signal indicative of where within a range of power quantization levels the received power lies. The required power for the full-rate mode will be highest, and the required power for the ⅛-rate mode will be lowest. For example, the following 5 levels can be defined:

Level 4—received power larger than the nominal full-rate power

Level 3—received power between the ½-rate and full-rate nominal powers

Level 2—received power between the ¼-rate and ½-rate nominal powers

Level 1—received power between the ⅛-rate and ¼-rate nominal powers

Level 0—received power less than the ⅛-rate nominal power.

Bits indicating the received power level are then combined with traffic data in encoder 34 and transmitted back to mobile station 50 as previously described. Mobile station 50 knows the data rate at which it transmitted and so power adjustments could be based on the knowledge of the transmission rate for the power control group corresponding to the feedback information as shown in Table 1. Table 1 illustrates a benefit to the multiple level implementation, which is that if the measured quality is much different than the desired level (possibly due to a sudden deep fade), a larger power adjustment can be made. In this implementation, 3 bits are needed to send back this 1-of-5 information. This increases the overhead on the feedback link.

TABLE 1

| Power Adjustments with Five Quality Levels | | | | |
|---|---|---|---|---|
| Received | Power Adjustment in dB | | | |
| Quality Level | Full Rate | ½ Rate | ¼ Rate | ⅛ Rate |
| 4 | −1 | −2 | −2 | −2 |
| 3 | +1 | −1 | −2 | −2 |
| 2 | +2 | +1 | −1 | −2 |
| 1 | +2 | +2 | +1 | −1 |
| 0 | +2 | +2 | +2 | +1 |

One way of reducing the amount of overhead necessary for power control in a variable rate system would be to restrict the number of transmission rates to a number that is of the form $2^n-1$ where n is an integer. For example, if one restricts a rate set to containing only 3 possible rates, then 2 bits would be needed to transmit the received power level. Another method for reducing the amount of overhead necessary for power control, is to provide feedback of quality information for lower rates less often. The quality measurements for these lower rates would also be made over the correspondingly longer time periods. This improves the accuracy of these lower-rate-mode quality measurements.

Another method for reducing the number of power control bits provided per frame is to vary the threshold values each frame. For example, in the case of four possible transmission rates, two alternating cases could be used, as illustrated in Tables 2 and 3.

TABLE 2

Power Adjustments at Even Times with Four Quality Levels

| Received Quality Level | Power Adjustment in dB | | | |
|---|---|---|---|---|
| | Full Rate | ½ Rate | ¼ Rate | ⅛ Rate |
| 4 | −1 | −2 | −2 | −2 |
| 3 | +1 | −1 | −1 | −2 |
| 2 or 1 | +2 | +1 | 0 | −1 |
| 0 | +2 | +2 | +1 | +1 |

TABLE 3

Power Adjustments at Odd Times with Four Quality Levels

| Received Quality Level | Power Adjustment in dB | | | |
|---|---|---|---|---|
| | Full Rate | ½ Rate | ¼ Rate | ⅛ Rate |
| 4 | −1 | −1 | −2 | −2 |
| 3 or 2 | +1 | 0 | −1 | −2 |
| 1 | +2 | +1 | +1 | −1 |
| 0 | +2 | +2 | +2 | +1 |

All of the abovementioned techniques impact capacity. One approach for reducing the amount of information that must be fed back is to make the estimates over longer periods, obtaining more accurate estimates by averaging over longer estimation periods. Unfortunately, in some fading applications, such a delay can cause significant performance degradation that is unacceptable.

A preferred approach of providing estimates over longer measurement intervals is to only use the longer measurement intervals for selected rates. For example, the power could be compared with a full-rate threshold every power control group, with a ½-rate threshold every 2 power control groups, with a ¼-rate threshold every 4 power control groups, and with an ⅛-rate threshold every 8 power control groups. With 16 power control groups per frame, this approach would require 16+8+4+2=30 bits per frame. The fact that the bits are not generated uniformly would cause an extra delay for some of the bits. The longer measurement intervals of this approach are similar to the delays for the lower rates with the current system where data is only transmitted on ½, ¼, or ⅛ of the power control groups, and the periods without data cannot provide power control information.

Another method for reducing the amount of power control information necessary is to transmit a power estimate for the first power control group of a frame and for subsequent power control groups in the frame estimates of quality differences with respect to the previous power control group are sent back. This technique is useful when all of the power control groups of a frame are transmitted with the same nominal power and there is no power control group gating.

Even in applications where the rate can change on a frame-to-frame basis, the rate typically only changes every few frames. Also, the rate is typically accurately determined at the end of each frame. An alternative exemplary embodiment that takes advantage of these characteristics is as follows. Base station 30 measures the quality of the received signal with respect to a single threshold every power control group, and sends back the 1-bit result of the comparison to mobile station 50.

For the first power control group, base station 30 uses a quality threshold based on the rate of the previous frame. Based on the measured received quality, base station 30 adjusts its quality threshold for the quality comparison of the next power control group. The thresholds for the comparisons on the following power control groups are adjusted based on the received quality with respect to the current threshold.

An exemplary implementation for performing this is illustrated in Tables 4 and 5. Table 4 shows the base station's next quality threshold and its transmitted feedback quality bit versus the current quality threshold and the measured received quality level. Table 5 shows the mobile station's power adjustment response to the feedback quality bit versus its known transmission rate for the power control group corresponding to that feedback bit and its estimate of the base station threshold that was used. The base station threshold is assumed to have been set based on the previous frame rate for the first power control group comparison and to have been set correctly for the other power control group comparisons. Quality thresholds for full-, ½-, ¼-, and ⅛-rate modes are used, and the received quality levels are as in Table 1 (i.e., level 4 corresponds to the largest received power).

TABLE 4

Base Station Actions

| Current Quality Threshold | Received Quality Level | Next Quality Threshold | Transmit Quality Bit |
|---|---|---|---|
| $T_{Full}$ | 4 | $T_{Full}$ | 1 |
| $T_{Full}$ | 3 | $T_{Full}$ | 0 |
| $T_{Full}$ | 2 | $T_{1/2}$ | 0 |
| $T_{Full}$ | 1 | $T_{1/4}$ | 0 |
| $T_{Full}$ | 0 | $T_{1/8}$ | 0 |
| $T_{1/2}$ | 4 | $T_{Full}$ | 1 |
| $T_{1/2}$ | 3 | $T_{1/2}$ | 1 |
| $T_{1/2}$ | 2 | $T_{1/2}$ | 0 |
| $T_{1/2}$ | 1 | $T_{1/4}$ | 0 |
| $T_{1/2}$ | 0 | $T_{1/8}$ | 0 |
| $T_{1/4}$ | 4 | $T_{Full}$ | 1 |
| $T_{1/4}$ | 3 | $T_{1/2}$ | 1 |
| $T_{1/4}$ | 2 | $T_{1/4}$ | 1 |
| $T_{1/4}$ | 1 | $T_{1/4}$ | 0 |
| $T_{1/4}$ | 0 | $T_{1/8}$ | 0 |
| $T_{1/8}$ | 4 | $T_{Full}$ | 1 |
| $T_{1/8}$ | 3 | $T_{1/2}$ | 1 |
| $T_{1/8}$ | 2 | $T_{1/4}$ | 1 |
| $T_{1/8}$ | 1 | $T_{1/8}$ | 1 |
| $T_{1/8}$ | 0 | $T_{1/8}$ | 0 |

TABLE 5

Mobile Station Receive Processing Actions

| Known Transmit Rate Corresponding to the Received Quality Bit | Estimate of the Threshold the Base Station Used to Determine the Quality Bit | Power Adjustment in dB for the Mobile Station's Next Power Control Group for the Noted Received Quality Bit | |
|---|---|---|---|
| | | Quality Bit = 1 | Quality Bit = 0 |
| Full | $T_{Full}$ | −1 | +1 |
| Full | $T_{1/2}$ | 0 | +2 |
| Full | $T_{1/4}$ | 0 | +3 |
| Full | $T_{1/8}$ | 0 | +4 |
| ½ | $T_{Full}$ | −2 | 0 |
| ½ | $T_{1/2}$ | −1 | +1 |
| ½ | $T_{1/4}$ | 0 | +2 |
| ½ | $T_{1/8}$ | 0 | +3 |
| ¼ | $T_{Full}$ | −3 | 0 |
| ¼ | $T_{1/2}$ | −2 | 0 |
| ¼ | $T_{1/4}$ | −1 | +1 |
| ¼ | $T_{1/8}$ | 0 | +2 |

TABLE 5-continued

Mobile Station Receive Processing Actions

| Known Transmit Rate Corresponding to the Received Quality Bit | Estimate of the Threshold the Base Station Used to Determine the Quality Bit | Power Adjustment in dB for the Mobile Station's Next Power Control Group for the Noted Received Quality Bit | |
|---|---|---|---|
| | | Quality Bit = 1 | Quality Bit = 0 |
| 1/8 | $T_{Full}$ | −4 | 0 |
| 1/8 | $T_{1/2}$ | −3 | 0 |
| 1/8 | $T_{1/4}$ | −2 | 0 |
| 1/8 | $T_{1/8}$ | −1 | +1 |

Table 5 gives an example of the base station and mobile station actions for a case where there are 16 power control groups, the previous frame was at the full rate, and the base station's quality bits are fed back to the mobile station with zero delay. In this example, the mobile station changes its rate from full-rate to 1/8-rate with the new frame. The power of the first power control group of the new frame is adjusted from the power used for the last power control group of the previous frame by the nominal difference in required powers between the full- and 1/8-rate modes. The base station's received quality level varies depending on channel conditions and the transmitted power level. The mobile station's received quality bit may not agree with the base station's value due to errors in the feedback link.

In the exemplary embodiment, encoder 34 provides the measured quality information uncoded or encoded separately from the other traffic data. In the exemplary embodiment, the traffic data is encoded on a frame basis, and the encoding is not done until the entire frame is received. The delay caused by the buffering of the data frame may cause a delay in power adjustment unacceptable in some fading environments.

In the current implementation described in the abovementioned Interim Standard, one uncoded bit of information is sent back every 1.25 ms. This information is sent in two consecutive 19.2-ksps modulation symbol intervals. Sending the one bit in two symbol intervals increases the energy of the information bit so that its error-rate performance is better. The power of these two symbols can also be adjusted to be different than for the other traffic symbols. In an alternative approach, two quality bits are sent back in the two modulation symbol intervals and their power is increased as required to achieve the desired error-rate performance.

Another method for reducing the capacity impact of closed loop power control is to provide the power control data in a modulation scheme that differs from the modulation scheme of the traffic data transmissions. For example if the traffic data is being transmitted using binary phase modulation, then the power-control information could be fed back using an M-ary phase modulation. For example, when there are N possible rates, there are N ideal received power set points. Since each of the N set points corresponds to a received power measurement threshold, the power measurement is in effect quantized to 1 of N+1 levels. This quantized information is then fed back. If there are four possible rates (N=4), then a 5-ary PSK modulation could be used for the feedback information. Similarly, if there are three possible rates, a 4-ary PSK modulation (i.e., QPSK) could be used.

There are typically two preferred methods of providing the return quality information in a data frame. Return quality information can be punctured into the encoded traffic channel data sequence, or the frame structure can be defined to provide slots for these bits. To minimize the delay in the feedback information, the return information would typically be inserted without forward-error-correction (FEC) coding or with FEC that uses a shorter block length than is used for the data traffic, which can typically accommodate larger delays. However, in applications where similar power-control feedback and forward traffic delays are acceptable, the power-control feedback information can be multiplexed into the forward traffic channel data.

One approach to implementing lower rate modes is to keep the same full-rate transmit symbol rate and to repeat the symbols as many times as necessary for the lower rates (2 times for the 1/2-rate modes, etc.). If the repeated symbols are transmitted consecutively, in effect with a longer symbol period, it may be reasonable to coherently combine the energy in the adjacent repeated-symbol environments. This would provide a performance improvement in conditions of additive white Gaussian noise (AWGN) or very slow fading applications, but in most fading environments the performance would be better if the repeated symbols are transmitted separated by as much as possible. Such a separation makes it less likely that all of the repeated symbols are degraded by the same fade because diversity is provided that may protect against burst error effects on the frame.

When the repeated symbols are dispersed, as for example by repeating the entire sequence, additional benefits from the feedback information may be attained. If the feedback information indicates that some of the symbols that were sent were received with a low quality, the power should be increased so that the following symbols are received with the nominal quality level. However, coding does not have to be relied upon to save those previously transmitted symbols that were received with a low quality if more of the repeated-symbol group still has to be sent. The later symbols can be given additional symbol energy in order that when the received repeated symbols are combined a closer-to-nominal quality is achieved. Conversely, additional power savings may be achieved by decrease the symbol energy of a repetition symbol if the initial symbols of the repeated symbol set are received with a higher quality than necessary.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. In a variable rate communication system wherein a first communication device for the transmission of a data packet of variable rate data in a data frame of a predetermined data capacity to a second communication device wherein when said data packet is less than said data capacity generating repeated versions of bits in said data packet and providing first version of said data packet bits and said repeated versions of said data packet bits in said data frame and wherein in the transmission power for transmitting said data frame is scaled in accordance with the data rate of said variable rate data, an apparatus for controlling said transmission power of said first communication device at said second communication device comprising:

receiver means for receiving said data frame;

frame quality determination means for determining a frame quality factor from said data frame;

comparison means for comparing said frame quality factor against a plurality of threshold values to provide a quality signal in accordance with said data rate and wherein each of said threshold values corresponds to a different data rate; and transmitter means for transmitting said quality signal.

2. The apparatus of claim 1 wherein in said data rate is of a set of N possible data rates, and wherein said comparison means is for comparing said quality factor against N threshold values and generating a signal indicative of one of N+1 quality signals.

3. The apparatus of claim 1 wherein said comparison means is for comparing said quality factor against temporally varying threshold values.

4. The apparatus of claim 3 wherein said data rate is selected from a set of data rates and wherein said temporally varying thresholds represent a first predetermined subset of possible thresholds during a first power control cycle and a second predetermined subset of possible thresholds during a second power control cycle.

5. The apparatus of claim 3 wherein said plurality of threshold values can be adjusted at each frame.

6. The apparatus of claim 3 wherein said plurality of threshold values are adjusted based on said frame quality factor from said data frame.

7. The apparatus of claim 1 further comprising rate determination means for determining said data rate from said received data frame.

8. The apparatus of claim 7 wherein said rate determination means is for separating a rate indication signal from said data frame and determining said data rate in accordance with said rate indication signal.

9. The apparatus of claim 7 wherein said comparison means is further for determining said comparison threshold in accordance with said rate determination.

10. The apparatus of claim 1 further comprising an encoding means interposed between said comparison means and said transmitter means for receiving said quality signal and traffic data and for combining said traffic data with said quality signal in accordance with a predetermined combination format.

11. The apparatus of claim 10 wherein said predetermined combination format overwrites portions of said traffic data with said quality signal.

12. The apparatus of claim 10 wherein said predetermined combination format provides said quality signal in predetermined gaps in said traffic data.

13. The apparatus of claim 11 wherein said frame quality factor is indicative of received power.

14. The apparatus of claim 1 wherein said frame quality factor is indicative of error rate.

15. The apparatus of claim 1 wherein said comparison means compares said frame quality indicator over a measurement interval corresponding to said data rate.

16. The apparatus of claim 1 wherein said comparison means generates relative quality signals for power control groups subsequent to a reference power control group.

17. The apparatus of claim 16 wherein said reference power control group is a first power control group of each frame.

18. The apparatus of claim 16 wherein said relative quality signals each comprises one bit.

19. The apparatus of claim 1 further comprising:

adjustment means for adjusting said transmission power of said first communication device in accordance with said quality signal.

20. The apparatus of claim 19 wherein said adjustment means adjusts said transmission power at one of a plurality of power adjustment steps.

21. The apparatus of claim 1 wherein said transmitter means modulates said quality signal using a modulation format different than a modulation format for traffic data from said second communication device.

22. The apparatus of claim 21 wherein said modulation format for said quality signal is M-ary phase modulation.

23. The apparatus of claim 21 wherein said modulation format for said quality signal is quaternary phase shift keying.

24. In a variable rate communication system wherein a first communication device for the transmission of a data packet of variable rate data in a data frame of a predetermined data capacity to a second communication device wherein when said data packet is less than said data capacity generating repeated versions of bits in said data packet and providing first version of said data packet bits and said repeated versions of said data packet bits in said data frame and wherein in the transmission power for transmitting said data frame is scaled in accordance with the data rate of said variable rate data, a method for controlling said transmission power of said first communication device at said second communication device comprising the steps of:

receiving said data frame;

determining a frame quality factor from said data frame;

comparing said quality factor against a plurality of threshold values wherein each threshold corresponds to different data rate;

generating a quality signal in accordance with said data rate; and transmitting said quality signal.

25. The apparatus of claim 24 wherein said step of comparing said frame quality factor against said plurality of threshold values comprises comparing said quality factor against temporally varying threshold values.

26. The method of claim 25 wherein said plurality of threshold values can be adjusted at each frame.

27. The method of claim 25 wherein said plurality of threshold values are adjusted based on said frame quality factor from said data frame.

28. The method of claim 24 further comprising the step of determining said data rate from said received data frame.

29. The method of claim 28 further comprising the step of separating a rate indication signal from said data frame and determining said data rate in accordance with said rate indication signal.

30. The method of claim 28 further comprising the step of determining said comparison threshold in accordance with said rate determination.

31. The method of claim 24 wherein a traffic data and said quality signal are combined in accordance with a predetermined combination format and wherein said predetermined combination format overwrites portions of said traffic data with said quality signal.

32. The method of claim 24 wherein a traffic data and said quality signal are combined in accordance with a predetermined combination format and wherein said predetermined combination format provides said quality signal in predetermined gaps in said traffic data.

33. The method of claim 24 wherein said frame quality factor is indicative of received power.

34. The method of claim 24 wherein said frame quality factor is indicative of error rate.

35. The method of claim 24 wherein said comparing step is performed over a measurement interval corresponding to said data rate.

36. The method of claim 24 wherein said generating step generates relative quality signals for power control groups subsequent to a reference power control group.

37. The method of claim 36 wherein said reference power control group is a first power control group of each frame.

38. The method of claim 36 wherein said relative quality signals each comprises one bit.

39. The method of claim 24 further comprising the step of:
adjusting said transmission power of said first communication device in accordance with said quality signal.

40. The method of claim 39 wherein said adjusting step is performed at one of a plurality of power adjustment steps.

41. The method of claim 24 wherein said transmitting step is performed using a modulation format different than a modulation format for traffic data from said second communication device.

42. The method of claim 41 wherein said modulation format for said quality signal is M-ary phase modulation.

43. The method of claim 41 wherein said modulation format for said quality signal is quaternary phase shift keying.

44. In a variable rate communication system wherein a first communication device for the transmission of a data packet of variable rate data in a data frame of a predetermined data capacity to a second communication device wherein when said data packet is less than said data capacity generating repeated versions of bits in said data packet and providing first version of said data packet bits and said repeated versions of said data packet bits in said data frame and wherein in the transmission power for transmitting said data frame is scaled in accordance with the data rate of said variable rate data, a system for controlling said transmission power of said first communication device at said second communication device comprising:

a receiver for receiving said data frame;

a frame quality measurement circuit for determining a frame quality factor from said data frame;

a comparer for comparing said frame quality factor against a plurality of threshold values to provide a quality signal in accordance with said data rate and wherein each of said threshold values corresponds to a different data rate; and a transmitter for transmitting said quality signal.

45. The apparatus of claim 44 wherein in said data rate is of a set of N possible data rates, and wherein said comparer is for comparing said quality factor against N threshold values and generating a signal indicative of one of N+1 quality signals.

46. The system of claim 44 further comprising rate estimator for estimating said data rate from said received data frame.

47. The system of claim 46 wherein said rate estimator is for separating a rate indication signal from said data frame and determining said data rate in accordance with said rate indication signal.

48. The system of claim 44 further comprising an encoder interposed between said comparer and said transmitter for receiving said quality signal and traffic data and for combining said traffic data with said quality signal in accordance with a predetermined combination format.

49. The system of claim 48 wherein said predetermined combination format overwrites portions of said traffic data with said quality signal.

50. The system of claim 48 wherein said predetermined combination format provides said quality signal in predetermined gaps in said traffic data.

51. The system of claim 44 wherein said frame quality factor is indicative of received power.

52. The system of claim 44 wherein said frame quality factor is indicative of error rate.

53. The system of claim 44 wherein said comparer is for comparing said quality factor against temporally varying threshold values.

54. The apparatus of claim 53 wherein said data rate is selected from a set of data rates and wherein said temporally varying thresholds represent a first predetermined subset of possible thresholds during a first power control cycle and a second predetermined subset of possible thresholds during a second power control cycle.

55. The system of claim 53 wherein said plurality of threshold values can be adjusted at each frame.

56. The system of claim 53 wherein said plurality of threshold values are adjusted based on said frame quality factor from said data frame.

57. The system of claim 44 wherein said comparer compares said frame quality indicator over a measurement interval corresponding to said data rate.

58. The system of claim 44 wherein said comparer generates relative quality signals for power control groups subsequent to a reference power control group.

59. The system of claim 58 wherein said reference power control group is a first power control group of each frame.

60. The system of claim 58 wherein said relative quality signals each comprises one bit.

61. The system of claim 44 further comprising:
a transmitter at said first communication device for adjusting said transmission power of said first communication device in accordance with said quality signal.

62. The system of claim 61 wherein said transmission power of said first communication device is adjusted at one of a plurality of power adjustment steps.

63. The system of claim 44 wherein said transmitter modulates said quality signal using a modulation format different than a modulation format for traffic data from said second communication device.

64. The system of claim 63 wherein said modulation format for said quality signal is M-ary phase modulation.

65. The system of claim 63 wherein said modulation format for said quality signal is quaternary phase shift keying.

* * * * *